United States Patent [19]

Ackman et al.

[11] 4,382,287
[45] May 3, 1983

[54] PSEUDO-SYNCHRONIZED DATA COMMUNICATION SYSTEM

[75] Inventors: Mark E. Ackman, Cockeysville, Md.; Wayne L. Dufek, North Hopewell Township, York County, Pa.; Charles C. McCarthy, Baltimore, Md.; Edward E. Kopicky, Bel Air, Md.

[73] Assignee: Westinghouse Electric Corp., Pittsburgh, Pa.

[21] Appl. No.: 168,997

[22] Filed: Jul. 15, 1980

[51] Int. Cl.³ ............................................. G06F 15/46
[52] U.S. Cl. ................................ 364/900; 340/825.06
[58] Field of Search .............. 340/151, 825.08, 825.06, 340/825.15; 364/200, 900, 550, 554; 455/3.5

[56] References Cited
U.S. PATENT DOCUMENTS 3,636,331  1/1972  Amrehn ........................ 364/741 X
3,668,649  6/1972  Pedersen et al. .................... 364/200
4,016,548  4/1977  Law et al. ........................ 364/200 X
4,027,289  5/1977  Toman ................................ 364/900
4,030,075  6/1977  Barlow ............................... 364/200
4,047,159  9/1977  Boudry ............................... 364/200

Primary Examiner—James D. Thomas
Assistant Examiner—David Y. Eng
Attorney, Agent, or Firm—D. Schron

[57] ABSTRACT

A system wherein a plurality of remote stations, in response to a request from a primary terminal, will transmit requested data to the primary terminal and to a secondary terminal. The secondary terminal is operable to receive and process the data transmitted in synchronism with the requests from the primary, and without any synchronizing information between the primary and secondary terminals. This is accomplished with the provision of data processing means in the two terminals which have identical memory maps of the sequencing operation.

5 Claims, 3 Drawing Figures

PSEUDO-SYNCHRONIZED DATA COMMUNICATION SYSTEM

BACKGROUND OF THE INVENTION

1. Field of the Invention

Data communication systems involving both two-way and one-way only communication links.

2. Description of the Prior Art

A number of data transmission systems exist which require certain restrictions on transmissions between different classifications of equipment.

For example, in a nuclear power generating complex, hundreds of remote stations may be located throughout the complex for gathering, by means of sensors, data relative to radiation levels, pressures, temperatures, and wind and fluid flows, to name a few. Each of the remote stations includes a computer means for handling the data and for transmitting such data back to a central control room for display, interpretation and any necessary action.

There are two classes of remote stations, a first being a safety type which can automatically operate to provide various safety functions if required, without human intervention. These safety remote stations are in two-way communication with a primary, or safety console which may be located in the central control room and which is operable to request and receive data from these safety remote stations. The safety class equipment requires special qualification tests and fabrication controls to quarantee its operability under a wide range of accident conditions.

A second type of classification for a remote station is a non-safety or control station which is in two-way data communication with a non-safety, or secondary console within the control room. This secondary console is also operable to receive the data transmitted by the safety remote stations with the restriction that it may not transmit requests for data to these safety remote stations nor may it be in communication with the primary console relative to such requests for data.

Accordingly, the primary console requests data without the knowledge of the secondary console which is to receive such data. The present invention provides a means for accomplishing such operation with minimal requirements for hardware and data communication cabling.

SUMMARY OF THE INVENTION

The system includes a plurality of remote stations each including means for gathering and storing data. A primary terminal is included having means for addressing the remote stations in a predetermined sequence for requesting and receiving the stored data from the respective addressed stations. A secondary terminal includes a data connection for receiving stored data transmitted by each addressed remote station with a gating means being provided for each one of the data connections. Means are provided for enabling one of the gating means and after its receipt of data will thereafter enable the remainder of the gating means in the exact same predetermined sequence in which the remote stations are addressed by the primary terminal.

DESCRIPTION OF THE PREFERRED EMBODIMENT

Although the invention is applicable to a variety of systems, it will be described by way of example with respect to a nuclear power generating complex. The illustrative embodiment of FIG. 1 includes a central control station 10 in communication with a first plurality of remote stations 12-1 to 12-N and with a second plurality of remote stations 14-1 to 14-M, each for gathering and processing information provided by a plurality of different sensors, S.

Central control station 10 includes a primary console or terminal 16 in addition to a secondary console or terminal 18. Primary terminal 16 is in two-way data communication with remote stations 12-1 to 12-N by means of a series of two-way data links 20-1 to 20-N respectively. Similarly, the secondary terminal 18 is in two-way data communication with remote stations 14-1 to 14-M by means of respective two-way data links 22-1 to 22-M.

These latter stations 14-1 through 14-M constitute stations of the control variety for performing certain functions under the control of an operator. Stations 12-1 to 12-N however are of the safety variety operable to control various aspects of the complex without human intervention required and with independence from the non-safety equipment quaranteed.

During the course of operation, stations 12-1 to 12-N are addressed from the primary terminal 16 so as to transmit data thereto. These data are additionally provided to the secondary terminal 18 for display purposes by means of one-way-only data links 24-1 to 24-N respectively. Communication from the secondary terminal 18 to the remote stations 12-1 to 12-N is not allowed nor is direct communication from the primary terminal 16 to the secondary terminal 18, these restrictions being for safety purposes in that any damage or operating errors in the secondary terminal 18 must not affect the automatic operations of the safety remote stations.

Since the remote stations 12-1 to 12-N are being addressed in a predetermined sequence for transmitting data, it is desirable that secondary terminal 18 receive these data and process them for display without any synchronizing information from the terminal that requested the data, that is, primary terminal 16.

Figure 1:
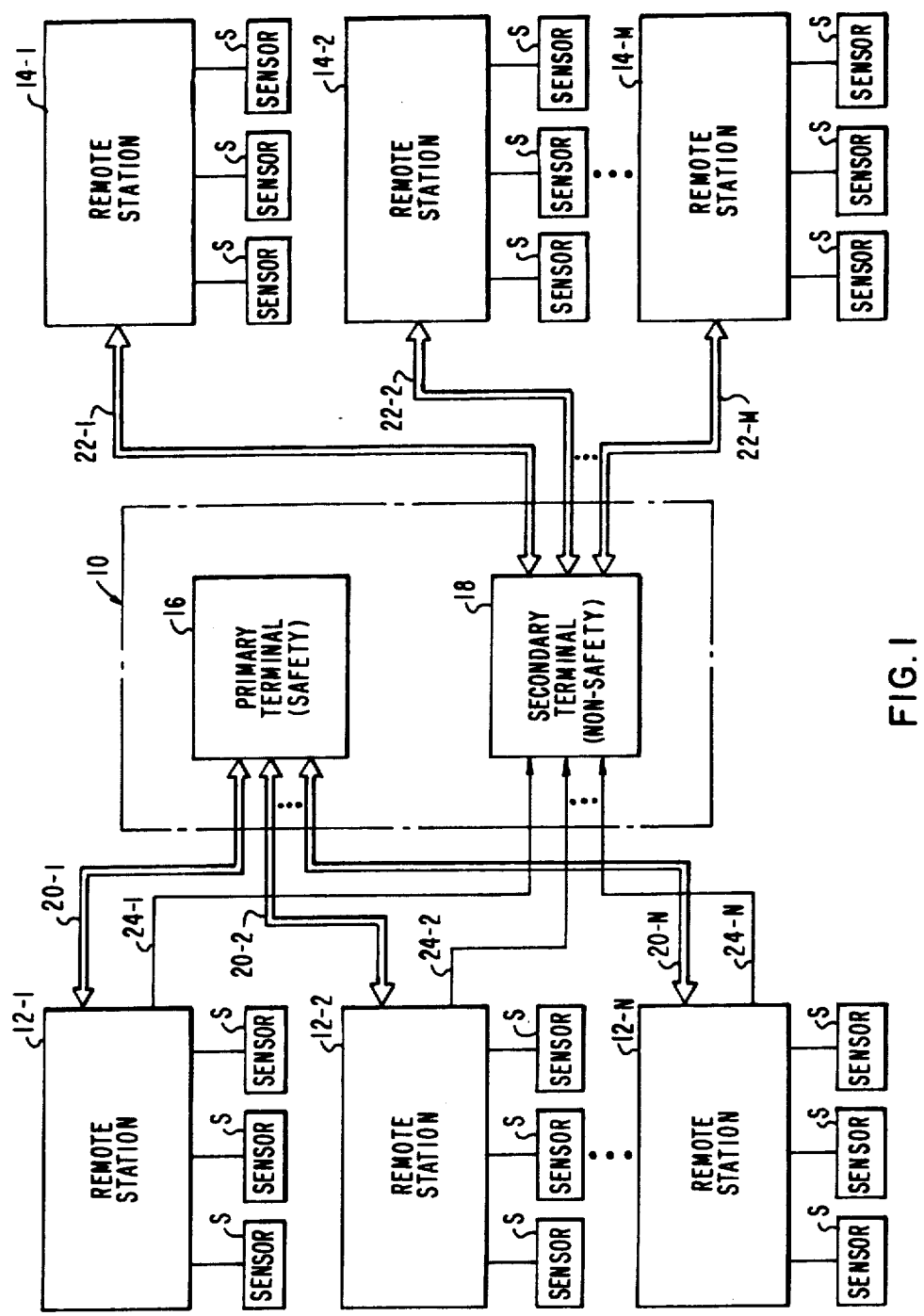
FIG. 1 is a block diagram of a typical installation requiring a communication link.
Figure 2:
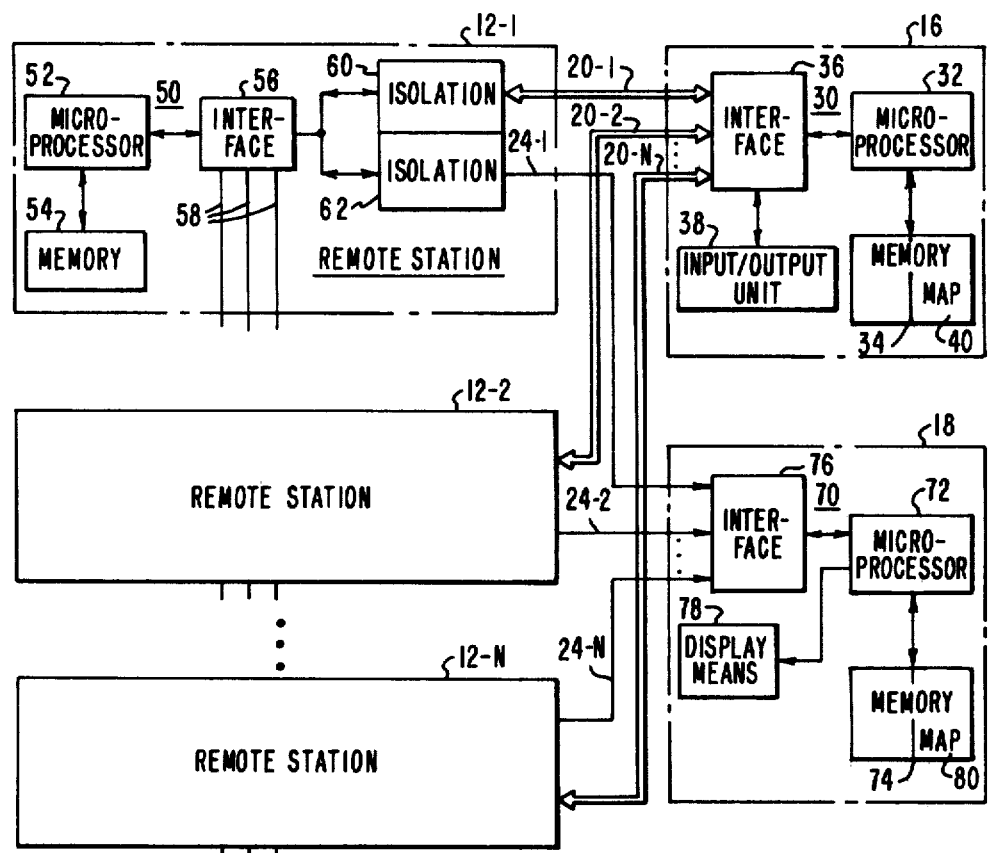
FIG. 2 is a block diagram of a preferred embodiment of the present invention.

Portions of the apparatus of FIG. 1 related to the present invention are illustrated in somewhat more detail in FIG. 2. Primary terminal 16 includes data processing means 30 comprised of a microprocessor 32, memory means 34 and interface circuitry 36 in communication with an input/output unit 38.

During operation, the data processing means 30 addresses and requests certain information from each of the remote stations 12-1 through 12-N in a certain predetermined sequence, such sequence being stored in a portion 40 of memory 34, such portion 40 herein being termed a memory map.

A typical remote station as illustrated by station 12-1 includes data processing means 50 comprised of microprocessor 52, memory 54, and interface circuitry 56 which receives inputs from the remote sensors by means of input leads 58.

The communication link in such arrangement must allow for ground potential differences between stations. Accordingly, it is common to put in some sort of isolation circuitry between the control station and remote stations, one form of isolation being optical isolation. Accordingly, remote station 12-1 includes isolation circuits 60 and 62 for this purpose. Isolation circuit 62 also serves to provide the required boundary between safety and non-safety equipment.

Secondary terminal 18 includes data processing means 70 comprised of microprocessor 72, memory 74 and interface circuitry 76. Secondary terminal 18 will generally include display means 78 operated by a number of microprocessors including microprocessor 72. These microprocessors are well-known commercially available items one example being the INTEL 8080 microprocessor.

A request for data initiated by primary terminal 16 is transmitted via two-way data line 20-1 and is communicated to the data processing means 50 by way of isolation circuitry 60. In response to such request, data processing means 50 will cause the requested data to be transmitted via the isolation circuitry 60 and data link 20-1 back to primary terminal 16. In addition, the same data will be provided to secondary terminal 18 by way of isolation circuitry 62 and one way data link 24-1. After the data transmission individual ones of the remaining remote stations will be addressed for transmission of data, in a predetermined sequence as determined by the memory map portion 40 of memory 34.

Figure 3:
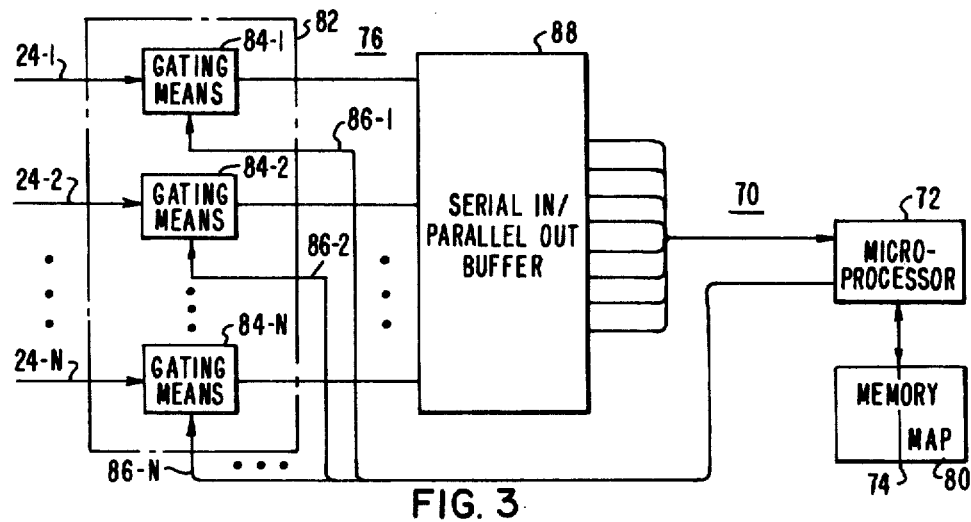
FIG. 3 is a block diagram illustrating a portion of the apparatus in FIG. 2, in somewhat more detail.

In the present invention memory 74 of data processing means 70 in the secondary terminal 18 also includes a memory map portion 80 identical to memory map portion 40 within primary terminal 16. In this manner the apparatus in the secondary terminal is synchronized with the apparatus in the primary terminal with respect to receipt of transmitted information, without the requirement of a direct connection between the two terminals. This operation may be explained with further reference to FIG. 3.

The interface circuitry 76 of data processing means 70 includes a gating circuit 82 having a plurality of gating means 84-1 to 84-N each operable to receive data from a specific remote station by way of respective data links 24-1 to 24-N. Each gating means, when provided with a unique enabling signal on lines 86-1 to 86-N from microprocessor 72, will gate any data through to a serial in/parallel out buffer 88 which, when full, will transfer the information to microprocessor 72.

For purposes of illustration let it be assumed that N is 200 and that the sequence of addressing is in order from 1 to N and thereafter continuously repeated in that sequence. Let it further be assumed that in a worst case condition, gating means 84-N is being supplied with an enabling signal on line 86-N wheras the first remote station 24-1 is being addressed. As a result of the first request, information comes in to gating means 84-1, but will not be passed thereby since it is not enabled. The second remote station addressed will provide data to gating means 84-2 which likewise will not pass any information and this process is repeated until information is received on data link 24-N such that the enabled gating means 84-N will pass the information through to buffer 86 and microprocessor 72.

Once this information has been gated through and sensed by microprocessor 72 it will then refer to the memory map 80 which will have stored therein the next remote station to be addressed by the primary terminal 16, and accordingly microprocessor 72 will provide the proper enabling signal to the gating means, gating means 84-1, connected to the next addressed remote station. Thereafter the gating means will be enabled in the proper sequence as determined by memory map 80 so that thereafter the data transmitted by each addressed remote station will be received and processed by data processing means 70 in the secondary terminal.

In the example given the first 199 data transmissions will not have been received by data processing means 70, however, since the addressing process is continuous and cyclical the lost data represents an insignificant portion of the total transmissions that take place. After, at the very most, N-1 separate data transmissions take place, the primary and secondary terminals will be in synchronization with respect to the remaining transmissions, this synchronization being accomplished without any synchronizing signals between the primary and secondary terminals.

Although the invention has been described with respect to a nuclear generating complex, it is of course applicable to various other systems which include one or more primary terminals and one or more secondary terminals wherein communication between the primary and secondary terminals is either impractical or undesirable.

We claim:

1. A data communication system comprising:
   (A) a plurality of remote stations each including means for gathering and storing data;
   (B) a primary terminal having a plurality of two-way data communication links and being in two-way data communication with said remote stations, including means for addressing said remote stations in a predetermined sequence and means for requesting and receiving stored data from said addressed remote stations thru said two-way data communication links;
   (C) a secondary terminal in one-way data communication with said remote stations and including a plurality of one-way-only data communication links each for receiving stored data transmitted by a respective of said addressed remote stations;
   (D) said secondary terminal including data utilization means coupled to the one-way data communication links;
   (E) said secondary terminal additionally including gating means for each said one-way-only data link and operable, when enabled, to gate received data to said data utilization means;
   (F) said secondary terminal further including means for enabling a selected one of said gating means and, after receipt of data by said selected gating means, enabling the remainder of said gating means in said same predetermined sequence in which said remote stations are addressed by said primary terminal.

2. Apparatus according to claim 1 wherein:
   (A) said primary and secondary terminals each include microprocessor means, and memory means for storing information;
   (B) said memory means of said primary terminal having stored therein a memory map of said predetermined sequence of addressing said remote stations;
   (C) said microprocessor means of said primary terminal being operable to address said remote stations in accordance with said predetermined sequence of addressing stored in memory map;

(D) said memory means of said secondary terminal having an identical said memory map; and (E) said microprocessor means of said secondary terminal being operable to enable said remainder of said gating means in accordance with the predetermined sequence of addressing stored in said identical memory map.

3. Apparatus according to claim 2 which includes:

(A) buffer means for temporarily storing data; and (B) each said gating means being operable to pass data received on said one-way-only data link to said buffer means.

4. Apparatus according to claim 3 wherein:

(A) said data received is in binary form; and (B) said buffer means is a serial in/parallel out buffer.

5. Apparatus according to claim 1 which includes:

(A) a central control station; and wherein (B) said primary and secondary terminals are located within said control station.

* * * * *